ated Dec. 22, 1970

United States Patent Office 3,549,636
Patented Dec. 22, 1970

3,549,636
2-ALKANOYL, ALKANOYLALKYL, ALKANOYL-OXYALKYL, AND HYDROXYALKYL SUBSTITUTED TETRAHYDRO - HALO - SULFAMYL-QUINAZOLINONES
Bola Vithal Shetty, Rochester, N.Y., assignor to Pennwalt Corporation, East Orange, N.J., a corporation of Pennsylvania
No Drawing. Filed Feb. 29, 1968, Ser. No. 709,184
The portion of the term of the patent subsequent to Dec. 26, 1984, has been disclaimed and dedicated to the Public
Int. Cl. C07d 51/48
U.S. Cl. 260—256.5
8 Claims

ABSTRACT OF THE DISCLOSURE

A 1,2,3,4-tetrahydro-7-halo-6-sulfamyl-4-quinazolinone compound, characterized by having in the 3-position an aryl or aralkyl group, and by having in the 2-position an alkanoyl, alkanoylalkyl, hydroxyalkyl or an alkanoyloxy-alkyl (a loweraliphatic ester of a hydroxyalkyl). These compounds have diuretic characteristics.

---

This invention relates to 1,2,3,4-tetrahydro-6-sulfamyl-4-quinazolinone compounds.

Diuretic compounds of the above type have been made, having a hydroxyalkyl group in the 2-position (see U.S. Pat. 3,214,429) but improvements in the diuretic and saluretic properties of such compounds were desired.

In accordance with this invention 1,2,3,4-tetrahydro-7-halo or 7-haloalkyl-6-sulfamyl - 4 - quinazolinone compounds have in the 3-position an aryl or aralkyl group and in the 2-position an alkanoyl, alkanoylalkyl, hydroxylower-alkyl or an alkanoyloxyloweralkyl. These compounds are improved diuretics.

The compounds of this invention are preferably of the following formula:

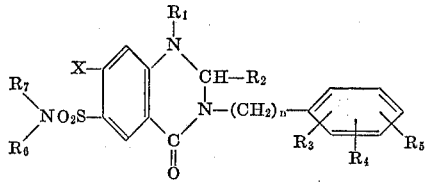

or pharmaceutically acceptable salts thereof, in which X is halogen or trifluoromethyl; $R_1$ is hydrogen or lower-alkyl; $R_2$ is loweralkanoyl, viz, $CH_3$—CO—; loweralka-noylloweralkyl, especially loweralkyl-CO-loweralkyl-; hydroxyloweralkyl, especially loweralkyl-CH   or   loweralkyl-CH-loweralkyl-
         |                    |
         OH                   OH or a loweraliphatic ester of a hydroxyloweralkyl (alkanoyloxyloweralkyl) especially -CH-loweralkyl   or-loweralkyl-CH-loweralkyl
 |                              |
 O—C O-loweralkyl               O—C O-loweralkyl $R_3$ is hydrogen, loweralkyl, loweralkoxy, loweralkoxy-alkyl, amino, sulfamyl, halogen, trifluoromethyl or hydroxy; $R_4$ and $R_5$ are any of $R_3$; $R_6$ and $R_7$ are hydrogen, loweralkyl or phenylloweralkyl, and $n$ is an integer from 0–4.

In the above formula X is preferably chlorine or trifluoromethyl, but bromine and other halogens are not precluded. $R_1$ is preferably hydrogen, but loweralkyls, such as methyl, ethyl, and propyl may be used. $R_2$ is preferably hydroxymethyl, hydroxyethyl or acetyl. $R_3$, $R_4$, and $R_5$ may be any of the stated radicals in the ortho, meta or para postions. Preferably $R_3$ is methyl in the ortho position; also where sulfamyl is used it is preferably present in the meta or para position with methyl in the ortho position.

Specific suitable compounds of the above formula include:

2-acetyl-7-chloro-6-sulfamyl-3-(o-tolyl)-1,2,3,4-tetra-hydro-4-quinazolinone;
2-acetyl-7-trifluoromethyl-6-sulfamyl-3-(o-tolyl)-1,2,3,4-tetrahydro-4-quinazolinone;
2-acetyl-7-chloro-6-sulfamyl-3-phenyl-1,2,3,4-tetrahydro-4-quinazolinone;
2-acetyl-7-chloro-6-sulfamyl-3-(p-tolyl)-1,2,3,4-tetra-hydro-4-quinazolinone;
2-acetyl-7-chloro-6-sulfamyl-3-(m-tolyl)-1,2,3,4-tetra-hydro-4-quinazolinone;
2-acetyl-7-trifluoromethyl-6-sulfamyl-3-(p-tolyl)-1,2,3,4-tetrahydro-4-quinazolinone;
2-propionyl-3-phenyl-6-sulfamyl-7-chloro-1,2,3,4-tetra-hydro-4-quinazolinone;
2-propionyl-3-(o-tolyl)-6-sulfamyl-7-chloro-1,2,3,4-tetra-hydro-4-quinazolinone;
2-acetyl-7-chloro-6-methylsulfamyl-3-(o-tolyl)-1,2,3,4-tetrahydro-4-quinazolinone;
2-acetyl-7-chloro-6-dimethylsulfamyl-3-(o-tolyl)-1,2,3,4-tetrahydro-4-quinazolinone;
2-propionyl-7-chloro-6-methylsulfamyl-3-phenyl-1,2,3,4-tetrahydro-4-quinazolinone;
2-acetyl-3-(p-chlorobenzyl)-6-sulfamyl-7-trifluoromethyl-1,2,3,4-tetrahydro-4-quinazolinone;
2-propionyl-3-(p-chlorobenzyl)-6-sulfamyl-7-trifluoro-methyl-1,2,3,4-tetrahydro-4-quinazolinone;
2-acetylmethyl-7-chloro-6-sulfamyl-3-(o-tolyl)-1,2,3,4-tetrahydro-4-quinazolinone;
2-acetylmethyl-7-chloro-6-sulfamyl-3-phenyl-1,2,3,4-tetrahydro-4-quinazolinone
2-acetylmethyl-7-chloro-6-methylsulfamyl-3-(o-tolyl)-1,2,3,4-tetrahydro-4-quinazolinone;
2-acetyl-7-chloro-6-sulfamyl-3-(2'-methyl-5'-sulfamyl)-1,2,3,4-tetrahydro-4-quinazolinone;
1-benzyl-2-acetylmethyl-7-chloro-6-sulfamyl-3-phenyl-1,2,3,4-tetrahydro-4-quinazolinone;
2-acetylmethyl-7-chloro-6-benzylsulfamyl-3-phenyl-1,2,3,4-tetrahydro-4-quinazolinone;
2-β-hydroxybutyl-7-chloro-6-sulfamyl-3-(o-tolyl)-1,2,3,4-tetrahydro-4-quinazolinone;
2-acetyloxymethyl-7-chloro-6-sulfamyl-3-(o-tolyl)-1,2,3,4-tetrahydro-4-quinazolinone;
2-acetyloxymethyl-7-trifluoromethyl-6-methylsulfamyl-3-phenyl-1,2,3,4-tetrahydro-4-quinazolinone;
1-methyl-2-β-hydroxypropyl-7-chloro-6-sulfamyl-3-(o-tolyl)-1,2,3,4-tetrahydro-4-quinazolinone;
1-methyl-2-β-hydroxypropyl-7-trifluoromethyl-6-methyl-sulfamyl-3-phenyl-1,2,3,4-tetrahydro-4-quinazolinone;
and the sodium salt of 2-acetyl-7-chloro-6-methylsulfamyl-3-(o-tolyl)-1,2,3,4-tetrahydro-4-quinazolinone.
2-acetyl-7-chloro-3-[2',3'-dimethylphenyl]-6-sulfamyl-1,2,3,4-tetrahydro-4-quinazolinone;
2-acetyl-3-(p-aminophenyl)-7-chloro-6-sulfamyl-1,2,3,4-tetrahydro-4-quinazolinone;
2-acetyl-7-chloro-3-(m-chlorophenyl)-6-sulfamyl-1,2,3,4-tetrahydro-4-quinazolinone;
2-acetylmethyl-7-chloro-3-(o-methoxyphenyl)-6-sulfamyl-1,2,3,4-tetrahydro-4-quinazolinone;
2-acetylmethyl-3-(p-aminophenyl)-7-chloro-6-sulfamyl-1,2,3,4-tetrahydro-4-quinazolinone;
2-acetylmethyl-7-chloro-6-sulfamyl-3-(o-trifluoromethyl-phenyl)-1,2,3,4-tetrahydro-4-quinazolinone;
2-acetylmethyl-7-chloro-3-(p-chlorophenyl)-6-sulfamyl-1,2,3,4-tetrahydro-4-quinazolinone;

7-chloro-2-(α-hydroxyethyl)-6-sulfamyl-3-o-tolyl-1,2,3,4-tetrahydro-4-quinazolinone;

3-(p-aminophenyl)-7-chloro-2-(α-hydroxyethyl)-6-sulfamyl-1,2,3,4-tetrahydro-4-quinazolinone;

7-chloro-3-(o-chlorophenyl)-2-(α-hydroxyethyl)-6-sulfamyl-1,2,3,4-tetrahydro-4-quinazolinone;

2-(α-acetoxyethyl)-7-chloro-3-(o-methoxyphenyl)-6-sulfamyl-1,2,3,4-tetrahydro-4-quinazolinone;

2-(α-acetoxyethyl)-3-(p-aminophenyl)-7-chloro-6-sulfamyl-1,2,3,4-tetrahydro-4-quinazolinone;

2-(α-acetoxyethyl)-7-chloro-3-(m-chlorophenyl)-6-sulfamyl-1,2,3,4-tetrahydro-4-quinazolinone.

The following table illustrates a number of suitable diuretic compounds:

Me = methyl

TABLE I

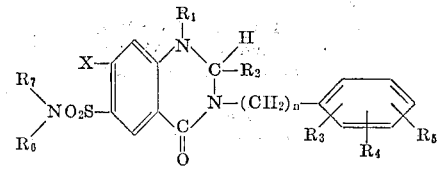

in which $R_6$ is H

| $R_1$ | $R_2$ | $R_3$ | X | $R_7$ | n | $R_4$ | $R_5$ |
|---|---|---|---|---|---|---|---|
| H | —COCH₃ | H | Cl | H | 0 | H | H |
| H | —COCH₃ | 2-Me | Cl | H | 0 | H | H |
| H | —COCH₃ | 2-Me | Cl | CH₃ | 0 | H | H |
| H | —COCH₃ | 3-Me | Cl | H | 1 | H | H |
| H | —COCH₃ | 4-Me | Cl | H | 1 | H | H |
| H | —COC₂H₅ | H | Cl | H | 1 | H | H |
| H | —COC₂H₅ | 2-Me | Cl | H | 0 | H | H |
| H | —COC₂H₅ | 2-Me | CF₃ | H | 0 | H | H |
| H | —COC₂H₅ | 3-Me | Cl | H | 0 | H | H |
| H | —COC₂H₅ | 4-Me | Cl | H | 0 | H | H |
| H | —COC₂H₅ | 4-Me | Cl | CH₃ | 1 | H | H |
| CH₃ | —COCH₃ | 2-Me | Cl | H | 2 | H | H |
| H | —CH₂COCH₃ | H | Cl | H | 0 | H | H |
| H | —CH₂COCH₃ | 2-Me | Cl | H | 0 | H | H |
| H | —CH₂COCH₃ | 3-Me | Cl | H | 0 | H | H |
| H | —CH₂COCH₃ | 4-Me | Cl | H | 0 | H | H |
| H | —CH₂COC₂H₅ | H | Cl | H | 1 | H | H |
| H | —CH₂COC₂H₅ | 2-Me | Cl | H | 0 | H | H |
| H | —CH₂COC₂H₅ | 3-Me | Cl | H | 0 | H | H |
| H | —CH₂COC₂H₅ | 4-Me | Cl | H | 1 | H | H |
| H | —CH₂CH₂COCH₃ | H | Cl | H | 0 | H | H |
| H | —CH₂CH₂COCH₃ | 2-Me | Cl | H | 1 | H | H |
| H | —CH₂CH₂COCH₃ | 4-Me | Cl | H | 1 | H | H |
| H | —COCH₃ | 4-Cl | Cl | H | 0 | H | H |
| H | —COCH₃ | 2-MeO | Cl | H | 0 | H | H |
| H | —COCH₂CH₃ | 4-Cl | Cl | H | 0 | H | H |
| CH₃ | —CH₂COCH₃ | 4-Cl | Cl | H | 0 | H | H |
| —C₂H₅ | —CH₂COC₂H₅ | 4-Cl | Cl | H | 0 | H | H |
| H | —COCH₃ | 4-Cl | Cl | CH₃ | 0 | H | H |
| H | —COCH₃ | 2-Cl | Cl | CH₃ | 0 | H | H |
| H | —COCH₂CH₃ | 2-Cl | Cl | H | 0 | H | H |
| H | —COCH₃ | 2-Me | Cl | H | 0 | 5-SO₂NH₂ | H |
| H | —COCH₃ | 2-Me | Cl | H | 0 | 6-Me | H |
| H | —COCH₃ | 2-Me | Cl | H | 0 | 3-Cl | H |
| H | —C(OH)—CH₃ | H | Cl | H | 0 | H | H |
| H | Same as above | 2-Me | Cl | H | 1 | H | H |
| H | do | 3-Me | Cl | H | 1 | H | H |
| H | do | 4-Me | Cl | H | 1 | H | H |
| H | —C(OH)—CH₂CH₃ | H | Cl | H | 1 | H | H |
| H | Same as above | 2-Me | Cl | H | 0 | H | H |
| H | do | 2-Me | Cl | CH₃ | 0 | H | H |
| H | do | 2-Me | CF₃ | H | 0 | H | H |
| H | do | 2-Me | Cl | H | 0 | 4-Cl | H |
| H | do | 2-Me | Cl | H | 0 | 6-Me | H |
| H | do | 2-Cl | Cl | H | 0 | H | H |
| H | do | 2-Me | Cl | H | 0 | 6-Me | 4-Cl |
| H | —C(H)(O—COCH₃)—CH₃ | H | Cl | H | 0 | H | H |
| H | Same as above | 2-Me | Cl | H | 0 | H | H |
| H | do | 4-Me | Cl | H | 0 | H | H |
| H | —C(H)(O—COC₂H₅)—CH₃ | 2-Me | Cl | H | 0 | H | H |
| H | Same as above | 3-Me | Cl | H | 1 | H | H |
| H | —C(H)(O—COC₃H₇)—CH₃ | 2-Me | Cl | H | 1 | H | H |
| H | —C(H)(O—COC₂H₅)—CH₃ | 2-Me | Cl | CH₃ | 1 | H | H |
| H | Same as above | 2-Me | CF₃ | H | 1 | H | H |

TABLE 1—Continued

| R₁ | R₂ | R₃ | X | R₇ | n | R₄ | R₅ |
|---|---|---|---|---|---|---|---|
| H | $-\underset{\underset{O-COCH_3}{|}}{\overset{\overset{H}{|}}{C}}-CH_2CH_3$ | 2-Me | Cl | H | 1 | H | H |
| H | Same as above | 3-Me | Cl | H | 1 | H | H |
| H | $-\underset{\underset{O-COCH_3}{|}}{C}-CH_2CH_3$ | 4-Me | Cl | H | 1 | H | H |
| H | $-\underset{\underset{O-COC_2H_5}{|}}{C}-CH_2CH_3$ | 4-Me | C | CH₃ | 1 | H | H |
| —C₂H₅ | $-\underset{\underset{O-COCH_3}{|}}{C}-CH_2CH_3$ | 2-Me | Cl | H | 0 | H | H |
| H | $-CH_2-\underset{\underset{H_3COC-O}{|}}{\overset{\overset{H}{|}}{C}}-CH_3$ | 4-Me | C | H | 0 | H | H |
| H | Same as above | 2-Me | Cl | H | 0 | H | H |
| H | do | 2-Me | Cl | CH₃ | 0 | H | H |
| H | $-CH_2CH_2\underset{\underset{H_3COC-O}{|}}{\overset{\overset{H}{|}}{C}}-CH_3$ | 2-Me | Cl | H | 0 | 4-Cl | H |
| H | Same as above | 4-Me | Cl | H | 0 | H | H |
| H | do | 2-Me | CF₃ | H | 1 | H | H |
| —CH₃ | $-\underset{\underset{H_3COC-O}{|}}{\overset{\overset{H\ H}{|\ |}}{C-C}}-CH_3$ (with H H above, H H below first two C) | 2-CF₃ | Cl | H | 1 | H | H |
| —CH₃ | $-\underset{\underset{H_3COC-O}{|}}{\overset{\overset{H\ H\ H}{|\ |\ |}}{C-C-C}}-C_2H_5$ | 2-Me | Cl | H | 1 | H | H |
| H | Same as above | 2-Me | Cl | H | 1 | H | H |
| H | $-\underset{\underset{H_3COC-O}{|}}{\overset{\overset{H\ H\ H}{|\ |\ |}}{C-C-C}}-C_3H_7$ | 2-Me | Cl | H | 1 | H | H |
| H | $\underset{\underset{OH}{|}}{CH_2CH_2CHCH_3}$ | 2-Me | Cl | H | 0 | H | H |
| H | Same as above | H | Cl | H | 1 | H | H |
| H | $\underset{\underset{OH}{|}}{CH_2\overset{\overset{H}{|}}{C}-CH_2CH_3}$ | 2-Me | Cl | H | 0 | H | H |
| H | $\underset{\underset{OH}{|}}{CH_2CH_2CHCH_3}$ | 2-Me 9 | Cl | H | 0 | H | H |
| H | Same as above | 2-Me | Cl | H | 0 | H | H |
| H | do | H | Cl | CH₃ | 0 | H | H |
| H | do | H | Cl | CH₃ | 0 | H | H |
| H | do | H | Cl | CH₃ | 0 | H | H |
| H | do | 4-Cl | Cl | C₂H₅ | 0 | H | H |
| —CH₃ | $\underset{\underset{OH}{|}}{CH_2CHCH_3}$ | 2-Me | Cl | H | 0 | H | H |
| —CH₃ | Same as above | 2-Me | Cl | H | 1 | H | H |
| —C₂H₅ | $\underset{\underset{OH}{|}}{CH_2CH_2CHCH_3}$ | 2-Me | Cl | CH₃ | 0 | H | H |
| H | —COC₂H₅ | 2-Me | Cl | H | 0 | H | H |
| H | —COC₂H₅ | 2-Me | Cl | H | 1 | H | H |
| H | CH₂COC₂H₅ | 2-Me | Cl | 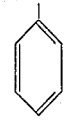 | 0 | H | H |

TABLE 1—Continued

| R₁ | R₂ | R₃ | X | R₇ | n | R₄ | R₅ |
|---|---|---|---|---|---|---|---|
| H | CH₂COC₂H₅ | 2-Me | CF₃ | HCH-C₆H₅ | 0 | H | H |
| H | CH₂COC₂H₅ | 2-Me | CF₃ | —C₂H₅ | 1 | H | H |
| C₆H₅-CH₂- | CH₂COC₂H₅ | H | Cl | H | 0 | H | H |

The following example is given to illustrate the preparation of compounds of this invention:

PREPARATION OF 2-ACETYL-7-CHLORO-6-SULFAMYL-3-(O-TOLYL) - 1,2,3,4 - TETRAHYDRO-4-QUINAZOLINONE

Synthetic route

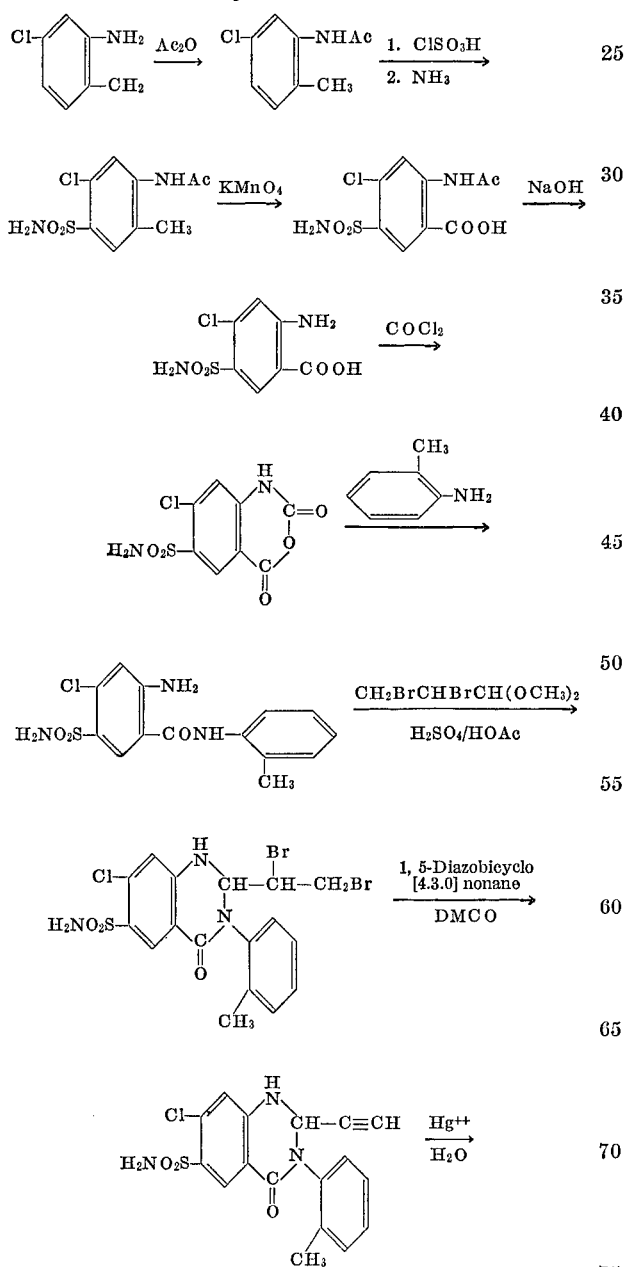

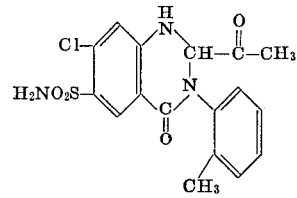

The other compounds of this invention can be made by modification of ingredients and quantities of the above example as is well understood by those skilled in the art. For example, the unsaturated quinazolinone compounds can be readily converted to the corresponding 1,2,3,4-tetrahydro-4(3H) - quinazolinones by reduction with sodium borohydride.

From pharmacology tests run on 2-acetyl-3-o-tolyl-6-sulfamyl-7-chloro-1,2,3,4 - tetrahydro - 4(3H) - quinazolinone and other indications and analogy, it appears that the compounds of this invention are effective diuretics, saluretics, and antihypertensives with low toxicity. For example, the following is a summary of the pharmacology on the above compound.

SUMMARY (a) Symptomatology and Acute LD50 in mice:
Orally—LD50>1000 mg./kg. (48 hours)
Interperitoneal—LD50>316 mg./kg. (48 hours)

(b) Cardiovascular in dog: Doses intravenously up to 10 mg./kg. were administered. There were no changes in the cardiovascular system.

(c) Diuretic assay in rats: When administered by the oral route in initial assays measuring output of urine (ml./kg.), Na⁺, and Cl⁻ (meq./kg.) at 4 hours and 21 hours after drug administration, the compound was found to promote water and salt loss, has a rapid onset and prolonged action, and appears to have a potency on volume diuresis better than that of quinethazone.

From the above and other tests, applicant states that the compounds described in this specification and those coming under the generic formula are effective and safe diuretics when administered to warm-blooded animals in the same manner and amounts as for quinethazone.

In the preceding specification the temperatures, wherever given, are in degrees centigrade.

Various modifications of the structural formula on column 1 of the specification may be made, such as, for example, has been done for other tetrahydro-7-halo-6-sulfamyl-4-quinazolinones known to the art, without departing from the spirit of the invention which is concerned particularly with diuretic quinazolinone compounds with the aryl and alkaryl group on the 3-position, and the group in the 2-position as indicated in the generic structural formula.

It will also be understood that any of the groups of R₂ may be substituted for the 2-hydrogen of the heterocycle to give a di compound or a spiro compound.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:
1. A compound of the formula:

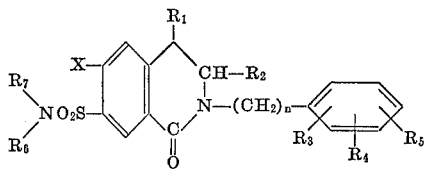

or the pharmaceutically acceptable salts thereof, in which X is halogen or trifluoromethyl; $R_1$ is hydrogen or loweralkyl; $R_2$ is loweralkanoyl, loweralkanoylloweralkyl, hydroxyloweralkyl, or a loweralkanoyloxy-loweralkyl; $R_3$ is hydrogen, loweralkyl, loweralkoxy, loweralkoxyalkyl, hydroxy, amino, sulfamyl, halogen or trifluoromethyl; $R_4$ and $R_5$ are any of the members of $R_3$; $R_6$ and $R_7$ ar hydrogen, loweralkyl or phenylloweralkyl, and $n$ is an integer from 0–4.

2. The compound of claim 1 wherein X is chlorine, $R_1$ is hydrogen, $R_2$ is loweralkanoyl, $R_3$ is ortho-methyl, $R_4$, $R_5$, $R_6$, and $R_7$ are hydrogen, and $n$ is 0.

3. The compound of claim 1 wherein X is chlorine, $R_1$ is hydrogen, $R_2$ is acetyl, $R_3$ is ortho-methyl, $R_4$, $R_5$, $R_6$ and $R_7$ are hydrogen, and $n$ is 0.

4. The compound of claim 1 wherein X is chlorine, $R_1$ is hydrogen, $R_2$ is hydroxyloweralkyl, $R_3$ is ortho-methyl, $R_4$, $R_5$ $R_6$ and $R_7$ are hydrogen, and $n$ is 0.

5. The compound of claim 1 wherein X is chlorine, $R_1$ is hydrogen, $R_2$ is loweralkanoyloxylloweralkyl, $R_3$ is ortho-methyl, $R_4$, $R_5$, $R_6$ and $R_7$ are hydrogen, and $n$ is 0.

6. The compound of claim 1 wherein X is trifluoromethyl, $R_1$ is hydrogen, $R_2$ is loweralkanoylloweralkyl, $R_3$ is ortho-methyl, $R_4$, $R_5$, $R_6$, and $R_7$ are hydrogen, and $n$ is 0.

7. The compound of claim 1 wherein the pharmaceutically acceptable salt is an alkali metal salt.

8. The compound of claim 1 in which the compound is in base form.

References Cited
UNITED STATES PATENTS

| | | | |
|---|---|---|---|
| 3,092,631 | 6/1963 | Song et al. | 260—256.5 |
| 3,214,429 | 10/1965 | Uskokovic et al. | 260—256.5 |
| 3,360,518 | 12/1967 | Snetty | 260—256.5 |

ALEX MAZEL, Primary Examiner

R. J. GALLAGHER, Assistant Examiner

U.S. Cl. X.R.
424—79, 25